C. LUTZE.
COASTER BRAKE.
APPLICATION FILED DEC. 3, 1913.

1,125,142. Patented Jan. 19, 1915.

WITNESSES:
John C. Sanders
M. B. Cottrell

INVENTOR:
Carl Lutze
By Wallace White
ATTY.

UNITED STATES PATENT OFFICE.

CARL LUTZE, OF SCHÖNEBECK-ON-THE-ELBE, GERMANY, ASSIGNOR TO METALL-INDUSTRIE SCHÖNEBECK AKTIEN GESELLSCHAFT, OF SCHÖNEBECK, GERMANY.

COASTER-BRAKE.

1,125,142. Specification of Letters Patent. Patented Jan. 19, 1915.

Application filed December 3, 1913. Serial No. 804,362.

*To all whom it may concern:*

Be it known that I, CARL LUTZE, director, a subject of Germany, residing at Schönebeck-on-the-Elbe, Germany, have invented new and useful Improvements in Coaster-Brakes, of which the following is a specification.

The present invention relates to free-wheel hubs for cycles of the kind in which a member attached to the sprocket effects by a screw action the coupling with the wheel hub at the one terminal position, and produces a braking action at the other terminal position, while at the intermediate position the wheel can turn free. For this a device is required which will prevent the nut of the screw action revolving with the sprocket, without being axially displaced. According to the present invention this object is obtained in a peculiar manner by means of a device, the essential part of which is a wire wound like the thread of a screw on the said sleeve, the one end of said coiled wire being secured to a stationary part of the hub and thereby prevented from revolving.

Figure 1:
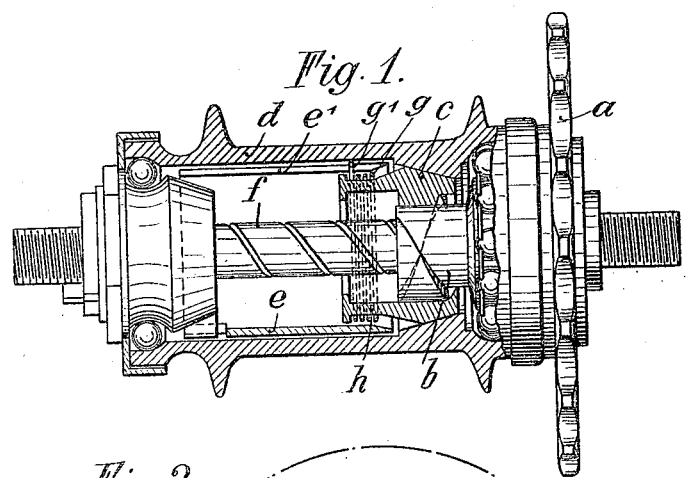
Figure 2:
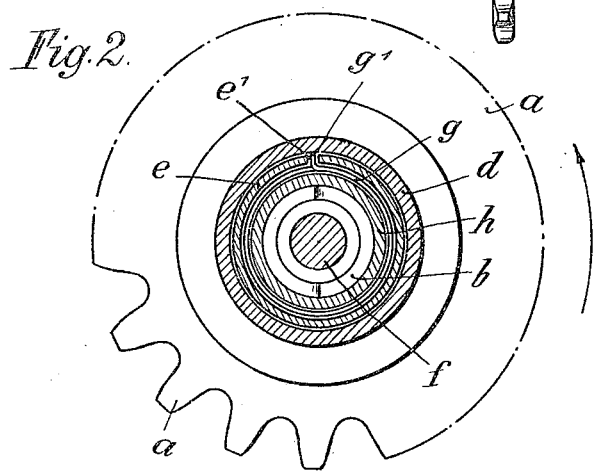

In the accompanying drawing a constructional form of the invention is exemplified in diagram, Figure 1 being a longitudinal section, Fig. 2 a cross section through the hub.

The sprocket $a$ is rigidly fitted to the part $b$ in a manner already known in the construction of free-wheel gears. This part $b$ has a screw thread on which screws the sleeve $c$ acting as a nut, so that when the sprocket is revolved, the sleeve $c$ is axially displaced. At the terminal position on the right in Fig. 1 the sleeve $c$ is coupled to the hub $d$ of the wheel by the engagement of friction cones. At the other terminal position on the left in Fig. 1 the cone at this end of the sleeve $c$ engages on a corresponding cone at the end of the slit brake shell $e$, expands this brake shell and brakes the wheel hub $d$ by its contact with the brake shell, which is prevented from revolving relatively to the fixed spindle $f$.

For preventing the sleeve $c$ from revolving freely with the screw $b$ without being axially displaced, a friction lock is provided. This locking device consists in a wire coil $g$ being wound like the thread of a screw on a neck $h$ of the sleeve $c$. The end $g'$ of this wire coil toward the brake shell is bent over and engages in the slot $e'$ of the brake shell $e$. If, now, the wire coil is wound like a right hand threaded screw, the neck $h$ will turn within the wire coil when the sprocket is turned in the ahead direction, thereby a slight friction is produced in the wire coil which tends to open the wire coil rigidly held at $g'$ $e'$. Before this friction is overcome the sleeve $c$ is axially displaced, and thereby coupled to the hub $d$ of the wheel. When the sprocket wheel is stopped, the frictional action of the rotating hub shell $d$ tends to rotate the sleeve $c$ in the same direction. This rotation, however, is prevented by the action of the screw $b$ to which, as stated thereinbefore, the sprocket wheel is rigidly fitted. Therefore, when the sprocket wheel is stopped and the screw $b$ is prevented from rotating the action of the thread throws the sleeve $c$ out of engagement with the hub shell $d$.

The braking of the hub shell is effected by back-pedaling the sprocket wheel. This action causes the neck $h$ to rotate underneath the wire coil $g$ in an opposite direction to that indicated by the arrow in Fig. 2, thus producing a friction which tends to tighten the wire coil $g$, whereby a further displacement of the sleeve $c$ toward the brake shell $e$ is effected, which movement causes said brake shell to expand, thus braking the hub $d$. During the displacement of the sleeve $c$ the end $g'$ of the wire coil slides in the slot $e'$ of the brake shell.

It is obvious that the wire coil may also be secured in any other suitable manner, without departing from the idea of the present invention.

I claim:

In a coaster brake, in combination, a hub, a brake sleeve having a slot formed therein, a sprocket, a threaded member rotatable with said sprocket, a sleeve on said member and longitudinally movable with respect thereto, said sleeve being provided with hub engaging and brake sleeve engaging means, and a wire coiled around said sleeve and having one of its ends engaging the slot in said brake sleeve whereby it is held against rotation.

In testimony whereof I have signed my name to this specification in the presence of two subscribing witnesses.

CARL LUTZE.

Witnesses:
ERNEST LIPKS.
L. OCHLMANN.

Copies of this patent may be obtained for five cents each, by addressing the "Commissioner of Patents, Washington, D. C."